Patented Feb. 27, 1951

2,543,421

UNITED STATES PATENT OFFICE 2,543,421

TRANSESTERIFICATION PROCESS

Donald Price, New York, N. Y., and Francis J. Sprules, Arlington, N. J., assignors to Nopco Chemical Company, a corporation of New Jersey No Drawing. Application November 3, 1942, Serial No. 464,394

19 Claims. (Cl. 260—410.9)

This invention relates to a process for the alkaline transesterification of fatty glycerides, and in particular to a process of this type in which the liberated glycerin may be recovered in substantially anhydrous form.

Fatty esters may be prepared by reacting a suitable alcohol, such as methanol, with fatty glycerides in the presence of caustic alkali-metal compounds, such as sodium methylate. Transesterification takes place, the alcohol displacing the glyceryl radicals in the fatty glycerides, yielding glycerin and the fatty acid esters of the alcohol. It has not been possible heretofore to efficiently recover the glycerin liberated during this process. This has been due primarily to the presence of alkali-metal compounds, such as the original alkali-metal catalyst compound, and the soaps developed during the reaction, which complicate the glycerin recovery. Attempts to distil off the glycerin result in the extensive decomposition thereof, due to the action of the catalyst. On the other hand, if it is attempted to neutralize the alkaline catalyst with an acid, the unavoidable excess acid will catalyse decomposition of the glycerin upon distillation. Further, the use of acids requires special corrosion-proof apparatus. Other neutralizing agents, such as carbon dioxide, sulfur dioxide and the like, result in the formation of alkali-metal compounds, such as sodium bicarbonate and bisulfite which form gel complexes with the glycerin and interfere with distillation thereof. Likewise, any soaps developed during the transesterification reaction contribute to the formation of non-distillable gels.

Accordingly, it is an object of this invention to provide a method for recovering the glycerin in transesterification processes.

Another object is to provide a transesterification process in which both fatty esters and anhydrous glycerins of excellent color and purity are recovered.

In accordance with this invention it has been discovered that ammonium halides will react by double decomposition with the alkali-metal compounds (catalyst and soaps) in glycerin or glycerin mixtures produced by transesterification reactions, to yield ammonia and sodium chloride. The reactions may be represented as follows, the symbol "Me" indicating methyl or other alkyl group:

(I)  $NaOMe + NH_4Cl \longrightarrow NaCl + NH_3 + MeOH$ (II) $NaOH + NH_4Cl \longrightarrow NaCl + NH_3 + H_2O$ (III)
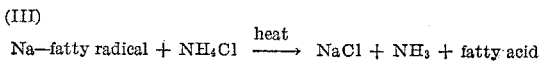

The sodium chloride produced by this reaction precipitates out, and the ammonia may be expelled by gentle heating. The liberated glycerin or glycerin mixture may be further processed, as by distillation, extraction etc. to recover the glycerin or other products.

The transesterification reaction preceding the glycerin-recovery process of this invention may involve any of the usual and suitable procedures and reactants. In general, larger excesses of the transesterifying alcohol may be employed than has hitherto been the case since, as will appear more fully hereinafter, the use of excess alcohol does not complicate the glycerin-recovery process. In general, it will be preferable to employ lower alcohols such as methanol, since, when these alcohols are used, the reaction mixture readily separates into two layers, one (hereinafter designated A) containing the esters, and the other (hereinafter designated N) consisting principally of glycerin, the alcohol and the alkali-metal compounds. The layers may be separated by decantation and the glycerin recovered from the glycerin-containing layer N without interference from the bulk of the fatty esters, which remains in the other layer A. However, even if higher alcohols, such as octanol, are employed, and a less effective, or no separation at all, of a glycerin layer N is obtained, the process of the present invention may be applied to reaction mixtures containing such higher alcohols, in order to neutralize the alkaline catalyst prior to recovery of glycerin from the mixture. Layer formation is obtained when higher alcohols, i. e. in the order of octanol, are used, when a major portion of these alcohols are distilled off from the mass subsequent to the addition of the ammonium halide. With regard to transesterification reactions in general which yield mixtures which do not separate well, it will be remarked in passing that the use of glyceride oils containing hydrophilic groups, such as castor oil; or of alcohols which are not highly reactive, such as secondary alcohols; likewise yield reaction mixtures which do not separate a glycerin layer N spontaneously. However, all these reaction mixtures likewise are amenable to the process of this invention.

The neutralization procedure of this invention may be carried out upon a glycerin layer N decanted from a transesterification reaction mixture as above described or, alternatively, upon a reaction mixture from which the glycerin has not been, or cannot be, separated. In either case, there is mixed into the glycerin layer N (or non-separating transesterified reaction mixture) ammonium chloride (or other ammonium halide) in an amount slightly in excess of the stoichiometrical quantity necessary to react with all of the alkali-metal compound catalyst which has been added. The reaction between the NH₄Cl and alkali-compounds may be hastened by gently distilling the mixture, in which case the reaction will be completed within about 20 minutes, with expulsion of the ammonia generated by reactions I–III above.

The NaCl and undissolved NH₄Cl may be filtered off directly upon completion of the neutralization reaction, but since the NH₄Cl is appreciably soluble in the mixture so long as it retains any substantial amounts of the transesterifying alcohol, it is preferable to continue the distillation until the alcohol has been removed to such an extent that no appreciable quantity of NH₄Cl remains in solution. However, the distillation should be discontinued before the glycerin layer becomes too viscous for effective settling and filtration. The mixture is then cooled and filtered to remove the NaCl and NH₄Cl. Likewise, especially in those cases in which the alcohol-glycerin layer has entrained a substantial portion, or the entirety, of the esters, it will be found that an oily layer containing esters, free fatty acids, etc. (hereinafter designated layer B) separates out at this point in the procedure and may be removed by decantation.

Distillation of the alcohol-glycerin layer is next resumed, and continued until the alcohol is completely removed. At this point, still another oily layer (hereinafter designated C) separates out and may be decanted. Thereafter, vacuum is applied, and the mass distilled to recover the glycerin.

Both the esters and the glycerin recovered in accordance with the process of this invention are characterized by a high degree of purity and by excellent color and odor. This appears to be due, in the case of the esters, to the fact that the glycerin layer N, in separating from the ester layer A, entrains the color bodies and other minor impurities, leaving the esters in relatively pure state. In the case of the glycerin, the layers B and C contain the fatty acids released from the soaps by the reaction of Equation III above, which acids appear to entrain the color bodies and minor impurities. The ester layers A, B, and C, as well as the glycerin, may be subjected to any further appropriate refinement, such as extraction, treatment with adsorbent chars and earths, redistillation, etc.

The foregoing discussion has dealt chiefly with the treatment of transesterification mixtures produced by sodium compound catalysts. However, the use of other alkali-metal catalyst compounds, such as compounds of potassium, rubidium and cesium, presents the same problem of gelling-up of the neutralization products with glycerin. These compounds may also be neutralized with ammonium halides, and consequently the process of this invention is equally suitable for the working-up of transesterification masses produced by the use of these other alkali-metal compounds.

In carrying out the transesterification step, any animal or vegetable fat or oil may be used, whether classified as drying, semi-drying or non-drying. Examples of such oils and fats include, among others, cottonseed, linseed, teaseed, rice bran, corn, peanut, olive, soybean, cod, herring, menhaden, coconut, palm, sardine, shark, whale oils, etc., as well as, beef tallow, mutton tallow, etc. According to the process, it is not necessary to employ neutral glycerides, as oils and fats containing up to 10% free fatty acids may be successfully used as the starting material. This factor is of great commercial importance as the step of alkali refining of the oil or fat may be dispensed with.

Any suitable aliphatic alcohol may be used such as methanol, ethanol, propanol, isopropanol, butanol, isobutanol, amyl alcohol, iso-amyl alcohol, methallyl alcohol, allyl alcohol, hexanol, octanol, etc. The alcohol selected will depend upon the end products desired, i. e., it will depend upon the particular esters desired. In those cases where it is immaterial what particular ester is obtained, it is advantageous to employ the lower alcohols, and preferably methanol, as the glycerin recovery is facilitated by the use of this lower alcohol. In many instances, it is advantageous to employ methanol with subsequent conversion of the methyl esters to the desired esters of the fatty acids.

In the transesterification operation, the alkali-metal itself or an alcoholate thereof may be used as the catalyst. In commercial operations it is preferred, in many instances, to employ the alcoholate, thus eliminating the hazard of using metallic sodium, potassium, etc. Alkali hydroxides may also be used.

With the foregoing discussion in mind, there are given hereinbelow detailed examples of the practice of this invention. All parts given are by weight.

Example I 130 parts (1 mol of triglycerides) of coconut oil, 57 parts (7.5 mols) of methanol and 3.1 parts (.3 mol) of sodium methoxide were mixed, and the mixture refluxed for one hour. The mixture was then cooled, whereupon two layers formed, an upper layer A containing principally the methyl esters of the fatty radicals of the coconut oil, and a lower layer N containing glycerin, methanol, sodium methylates and glycerates, and soaps formed by the action of the sodium upon the constituents of the coconut oil. This layer N also contained most of the color bodies of the original mixture. The ester layer A was decanted, washed with 5% aqueous sodium chloride, dried over anhydrous sodium sulfate, and distilled, yielding 118 parts (91% of the theoretical yield) of methyl coconut esters. 4 parts (.4 mol) of ammonium chloride were added to the glycerin-methanol layer N, and the mixture gently distilled until approximately ¾ of the methanol had been removed therefrom. During the distillation, a considerable amount of ammonia was evolved. The mixture was then allowed to cool, whereupon it separated into three layers, a small layer B of esters and fatty acids, a layer M of glycerin and methanol, and a sediment of sodium and ammonium chlorides. The ester layer B, which entrained with it substantially all of the color bodies of the original materials, was decanted from the glycerin-methanol layer. The glycerin-methanol layer M was then filtered to remove the sodium and ammonium chlorides. The filtered layer was then subjected to still further distillation to remove the remaining methanol, and cooled, whereupon still further small portions C of ester separated and were removed by shaking with petroleum ether. The resulting crude glycerin was then distilled under vacuum, yielding 17 parts (92% of the theoretical yield) of anhydrous, substantially water-white, colorless and odorless glycerin.

Example II

Soyabean oil _____ 579 parts (1 mol of triglycerides)
Anhydrous methanol _____ 194 parts (9 mols)
Sodium metal _____ 2.9 parts (0.18 mol)
Ammonium chloride _____ 10.0 parts (0.28 mol)

The procedure of Example I was exactly repeated, substituting the above-listed reactants for the corresponding reactants employed in Example I. There were obtained 57 parts (93% of the theoretical yield) of glycerin and 515 parts (89% of the theoretical yield) of methyl fatty esters.

Example III 289 parts (1 mol of triglycerides) of soyabean oil, 93 parts (6 mols) of absolute ethyl alcohol, and 1.4 parts (0.18 mol) of sodium were refluxed together for one hour. The mixture was then cooled, whereupon two layers formed, an upper layer A containing a considerable proportion of the fatty ethyl esters and a lower layer N containing the remainder of the fatty esters, glycerin, ethanol, sodium ethylates and glycerates, and soaps formed by the action of the sodium upon the fatty acids in the soyabean oil. The layer A was removed, and 3.5 parts (0.2 mol) of ammonium chloride were added to the layer N which was then subjected to distillation until substantially all the ethyl alcohol therein was removed. The residue was cooled, whereupon it separated into a substantial top layer B, containing principally the fatty esters, a middle layer M containing the glycerin and remaining ethyl alcohol, and a sediment of sodium and ammonium chlorides. The ester layer B was removed, combined with the ester layer A, washed, dried over anhydrous sodium sulfate, and distilled, yielding 194 parts (66% of the theoretical yield) of fatty ethyl esters. The glycerin layer M was filtered to remove the chloride salts and subjected to distillation. There were recovered 22 parts (72% of the theoretical yield) of glycerin.

Example IV 130 parts (1 mole) of coconut oil, and 360 parts (30 mols) of isopropanol and 1.3 parts (0.3 mol) of sodium were mixed and the mixture refluxed for 22 hours. The mixture was allowed to cool, but no layer A separated as in Examples I and II. 4 parts (0.4 mol) of ammonium chloride were added, and the mixture was distilled under vacuum to remove the isopropanol, during which the pH of the mass dropped from 11.6 to 5.4. A considerable amount of ammonia was evolved during the distillation. The mixture was then cooled, and a layer B of esters separated out and was decanted and refined by washing and distillation. The yield of esters was 100 parts (73% of theory). The glycerin layer was filtered to remove the sodium and ammonium chlorides, and then further distilled to remove the last traces of the isopropanol. The mixture was again cooled, and a layer C of esters which separated was removed by shaking the mixture with ligroin. Thereafter, the glycerin was distilled under vacuum, yielding 13.5 parts (73% of the theoretical) of glycerin.

Example V 433 parts (1 mol of triglycerides) of peanut oil, 157 parts (4 mols) of n-butanol and 2.7 parts (0.24 mol) of sodium were refluxed for 2 hours. 7 parts (0.3 mol) of ammonium chloride were added, and the mixture distilled to remove the n-butanol, during which the pH of the mass dropped from 8.4 to 5.96. The mass was then cooled, whereupon it separated into a top layer of n-butyl fatty esters, a middle layer of glycerin, and a sediment of chloride salts. The ester layer was removed and refined, yielding 400 parts (83% of the theoretical yield) of n-butyl fatty esters. The glycerin layer was filtered to remove the chlorides, and distilled to yield 26.5 parts (55% of the theoretical) of glycerin.

Example VI 130 parts (1.0 mol) of coconut oil, 156 parts (5 mols) of n-octanol and 0.3 part (.07 mol) of sodium were mixed and refluxed for 2 hours. 1 part (0.1 mol) of ammonium chloride was then added, and the mixture distilled in vacuo to remove the unreacted n-octanol. On cooling, a glycerin and salt mixture separated from the upper ester layer and was removed. The glycerin salt mixture was filtered free of solids, and decanted with ligroin to remove traces of ester. Finally, the glycerin layer was purified by distillation. 127 parts (85% of theory) of esters and 8 parts (43% of theory) of glycerin were recovered.

Example VII 320 parts (1 mol) of coconut oil, 216 parts (6 mols) of methallyl alcohol, 400 parts of a petroleum solvent boiling in the range 150–200° C., and 4.7 parts (0.45 mol) of sodium were refluxed together for 14 hours. The petroleum solvent was added for the purpose of raising the reflux temperature, thus speeding up the reaction. Thereafter, 12 parts (0.5 mol) of ammonium chloride were added, and the reaction mixture distilled to remove the methallyl alcohol. The mixture was decanted and filtered to remove the esters B and salts, and distillation was continued to remove the last traces of methallyl alcohol. A further layer of ester C separated on cooling and was removed, following which the glycerin layer was distilled. There were obtained 321 parts (94% theoretical yield) of esters and 24 parts (52% of theoretical) of glycerin.

Example VIII

Coconut oil ___ 117 parts (1 mol of triglyceride)
Methallyl alcohol ____ 720 parts (60 mols)
Sodium _____ 1.6 parts (.4 mol)
Ammonium chloride ___ 4 parts (.45 mol)

The procedure of Example VII was exactly repeated, substituting the above-listed reactants for the corresponding reactants in Example VII. There were obtained 13 parts (77% of theory) of glycerin, and 120 parts (96% of theory) of methallyl coconut esters.

Example IX 574 parts (1 mol) of linseed oil, 170 parts (8 mols) of methanol and 2.9 parts (.15 mol) of sodium were refluxed for 1 hour. The mixture was cooled, whereupon a layer A of esters separated and was decanted. 9 parts (.16 mol) of ammonium chloride were added to the glycerin-methanol layer, and approximately ¾ of the methanol was then distilled therefrom. The mixture was cooled, whereupon a layer B of esters separated. The esters were decanted and the glycerin-methanol layer was filtered, and subjected to further distillation until all the methanol was removed. A final slight layer C of esters separated and was decanted. The glycerin was distilled. Yield, 497 parts (86% theoretical) of esters, and 49 parts (79% theoretical) of glycerin. Both products were of excellent purity, odor and color.

*Example X*

183 parts (1 mol) of castor oil, 39 parts (6 mols) of methanol and 2.3 parts (0.2 mol) of sodium methoxide were refluxed for 1 hour. Upon cooling, a lower layer separated and was removed. After separation of the lower layer, 3 parts (.25 mol) of ammonium chloride were added thereto, and the mass was subjected to distillation to remove at least ¾ of the methanol. Upon cooling, the salts were filtered from the glycerin-methanol layer, and distillation was continued until all the methanol was removed. The layer of esters which separated from the glycerin was removed, and the glycerin was distilled. Yield: 5.6 parts (60% of theoretical) of glycerin.

*Example XI*

| | |
|---|---|
| Tallow | 560 parts (1 mol) |
| Methanol | 194 parts (9 mols) |
| Sodium | 2.9 parts (0.18 mol) |
| Ammonium chloride | 6.8 parts (0.20 mol) |

The procedure of Example I was exactly repeated, substituting the above reactants in place of the corresponding reactants in Example I. There were obtained 52.5 parts (86% of theory) of glycerin and 458 parts (82% of theory) of esters.

*Example XII*

320 parts (1 mol) of coconut oil, 182 parts (9 mols) of methanol and 3.2 parts (0.17 mol) of potassium metal were refluxed together for ½ hour. The mixture was cooled, and the upper, ester layer separating therefrom was removed. 5.4 parts (0.2 mol) of ammonium chloride were added to the glycerin-methanol layer, which was then subjected to distillation to remove ¾ of the methanol therein. The residue was cooled, filtered to remove salts, shaken with ligroin to remove traces of ester, and finally subjected to distillation to yield 30 parts (65% of the theoretical) of glycerin.

From the foregoing examples, it will be seen that this invention provides a cheap and readily operable method for neutralizing the alkaline catalysts remaining in glycerin and glycerin mixtures produced by transesterification. The ammonium chloride employed in the process is both cheap and free of operational hazards. Further, the glycerin and esters produced in accordance with this invention are characterized by a high degree of purity and excellent color and odor.

We therefore claim:

1. Method for neutralizing a mixture containing glycerin and an alkaline compound of an alkali metal which comprises adding an ammonium halide thereto and thereafter removing the glycerine from the mixture.

2. Method for neutralizing a mixture containing glycerin and an alkaline compound of sodium which comprises adding an ammonium halide thereto and thereafter removing the glycerine from the mixture.

3. Method for neutralizing a mixture containing glycerin and an alkaline compound of potassium which comprises adding an ammonium halide thereto and thereafter removing the glycerine from the mixture.

4. Method for neutralizing a mixture containing glycerin and an alkali metal alcoholate which comprises adding an ammonium halide thereto and thereafter removing the glycerine from the mixture.

5. Method for neutralizing a mixture containing glycerin and an alkaline compound of an alkali metal which comprises adding ammonium chloride thereto and thereafter removing the glycerine from the mixture.

6. Method for neutralizing a mixture containing glycerin and an alkaline compound of sodium which comprises adding ammonium chloride thereto and thereafter removing the glycerine from the mixture.

7. Method for neutralizing a mixture containing glycerin and an alkaline compound of potassium which comprises adding ammonium chloride thereto and thereafter removing the glycerine from the mixture.

8. Process for separating glycerin from a mixture containing glycerin and an alkaline compound of an alkali metal which comprises adding an ammonium halide to the mixture and recovering the glycerin therefrom by distillation.

9. Process of recovering glycerin from a composition containing glycerin, an alcohol, fatty esters and an alkaline compound of an alkali metal which comprises adding an ammonium halide to the mixture, subjecting the composition to distillation to remove the alcohol, separating the ester from the composition, and continuing distillation of the remaining portion of the composition to recover glycerin therefrom.

10. Process of recovering glycerin from a composition containing glycerin, methanol, and an alkaline compound of an alkali metal which comprises adding an ammonium halide to the composition, and then recovering the methanol and glycerin separately from the mixture by distillation.

11. Process of recovering glycerin from a non-separating composition containing glycerin, a higher alcohol, fatty esters of said higher alcohol, and an alkaline compound of an alkali metal which comprises adding an ammonium halide to the composition, distilling the composition to remove the higher alcohol, separating the fatty ester from the composition, and subjecting the remainder of the composition to distillation to recover the glycerin.

12. Process for the separation of glycerine from a mass resulting from a transesterification process which comprises heating together a fatty glyceride, an alcohol and an alkaline compound of an alkali metal to effect displacement of the glycerin from the glyceride by the alcohol, comprising adding an ammonium halide to the resultant mass, subjecting the mass to distillation to effect removal of the major portion of the excess alcohol therefrom, removing the fatty esters which separate from the mass, and distilling the mass to recover the glycerin therein.

13. Process for the separation of glycerine from a mass resulting from a transesterification process which comprises heating together a fatty glyceride, methanol and an alkaline compound of an alkali metal to effect displacement of the glyceryl radicals of the glycerides by the methanol, comprising separating the resultant fatty methyl esters from the mass, adding ammonium chloride to the remaining portion of the mass, and recovering the glycerin from the remaining portion of the mass by distillation.

14. Process for the separation of glycerine from a mass resulting from a transesterification process which comprises heating together a fatty glyceride, a higher alcohol and an alkaline compound of an alkali metal, comprising adding an ammonium halide to the resultant mass, subjecting the mass to distillation to remove the major portion of the higher alcohol therefrom, removing the fatty ester of the higher alcohols from the mass, and subjecting the remainder of the mass to distillation to recover the glycerin therein.

15. Process for the separation of glycerine from a mass resulting from a transesterification process which comprises heating together a glyceride of a hydroxylated higher fatty acid, an alcohol, and an alkaline compound of an alkali metal to effect displacement of the glyceryl residues in the glyceride by the alcohol, comprising adding an ammonium halide to the resultant mass, distilling the mass to remove the alcohol therefrom; removing from the mass the fatty esters separating therefrom, and distilling the remainder of the mass to recover the glycerin therein.

16. Process according to claim 13, wherein the fatty glyceride is coconut oil.

17. Process according to claim 14, wherein the higher alcohol is octanol.

18. Process according to claim 15, wherein the glyceride is castor oil.

19. Process according to claim 12, wherein the ammonium halide is ammonium chloride.

DONALD PRICE.
FRANCIS J. SPRULES.

REFERENCES CITED

The following references are of record in the file of this patent:

UNITED STATES PATENTS

| Number | Name | Date |
|---|---|---|
| 277,575 | Kessler | May 15, 1883 |
| 385,367 | Mitting | July 3, 1888 |
| 544,366 | Morrison | Aug. 13, 1895 |
| 774,172 | Garrigues | Nov. 8, 1904 |
| 2,271,619 | Bradshaw | Feb. 3, 1942 |
| 2,290,609 | Goss | July 21, 1942 |
| 2,383,580 | Arrowsmith et al. | Aug. 28, 1945 |

OTHER REFERENCES

General Inorganic Chemistry, Sneed, 1926, pages 329, 332.